Figures 1, 2:
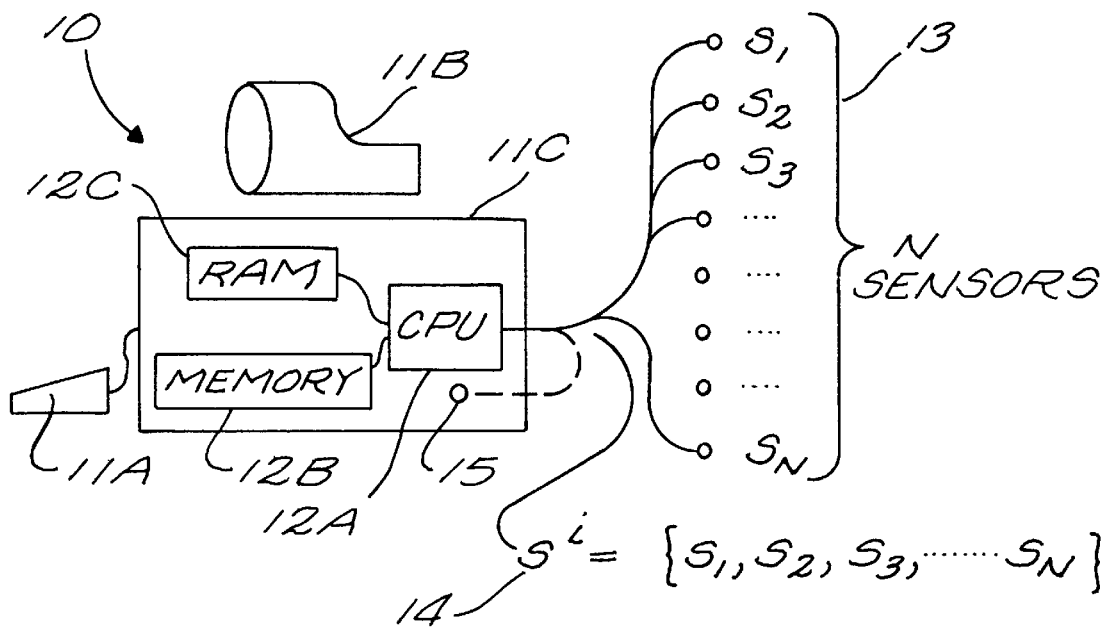

United States Patent [19]

Manthey

[11] Patent Number: 5,864,785
[45] Date of Patent: Jan. 26, 1999

[54] REACTIVE COMPUTER SYSTEM

[76] Inventor: Michael Manthey, Rodsteduej 29, Sudrup, Denmark, 9541

[21] Appl. No.: 912,917

[22] Filed: Aug. 15, 1997

[51] Int. Cl.$^6$ .................................................. G06F 15/00
[52] U.S. Cl. ...................... 702/187; 702/188; 702/189; 702/116
[58] Field of Search ........................ 364/550, 551.01, 364/141, 152, 184; 340/825.3, 825.31, 508, 522; 395/20, 22, 23; 702/116, 119, 187, 188, 189; 345/440

[56] References Cited

U.S. PATENT DOCUMENTS

| | | | |
|---|---|---|---|
| 4,718,025 | 1/1988 | Minor et al. | 364/550 |
| 4,829,450 | 5/1989 | Manthey | 395/60 |
| 4,857,912 | 8/1989 | Everett, Jr. et al. | 340/825.3 |
| 5,172,253 | 12/1992 | Lynne | 395/22 |
| 5,195,029 | 3/1993 | Murai et al. | 364/184 |
| 5,367,449 | 11/1994 | Manthley | 364/152 |
| 5,517,429 | 5/1996 | Harrison | 340/541 |

*Primary Examiner*—Louis M. Arana
*Assistant Examiner*—Bryan Bui

[57] ABSTRACT

An improved computer and system thereof which monitors the state of an array of sensors. In the preferred embodiment, these sensors monitor a physical or internal condition and have two states. The invention establishes a time window and identifies which of the sensors have changed state within the time window. The sensors which have changed state are then grouped into a "tuple" which is used by an operator to analyze the operations of the environment being studied using such methods as co-exclusion. Through selective control of the length of the time window, changes in two or more sensors permit co-exclusion properties to be inferred.

18 Claims, 2 Drawing Sheets

$$S^i = \{0\ 1\ 1\ 0\ 1\ 1\ 0\ 0\ 1\ 0\ 0\ \phantom{1}\}$$
$$S^{i+\Delta t} = \{0\ 1\ 0\ 0\ 1\ 1\ 0\ 1\ 1\ 0\ 1\ \phantom{1}\}$$
$$XOR = \{0\ 0\ 1\ 0\ 0\ 0\ 0\ 1\ 0\ 0\ 1\ \phantom{1}\}$$
$$\phantom{XOR = \{0\ 0\ }S_3\phantom{\ 0\ 0\ 0\ 0\ }S_8\phantom{\ 0\ 0\ }S_{11}$$

REACTIVE COMPUTER SYSTEM

BACKGROUND OF THE INVENTION

This invention relates generally to computers and more particularly to computers which monitor physical conditions.

In a great many applications, there is a need to effectively gather information about an environment. The problems associated with this task are compounded by the vast number of sensors which can be utilized in monitoring the environment. Often, certain physical conditions are related. To simplify the monitoring system and to understand the environment better, it is important to identify which operations are acting in "unison" or in grouped action.

In a typical situation, the sensors have two different states: currently being stimulated; currently not being stimulated.

There have been several attempts to create systems which attempt to gather "causal" information about the physical surroundings. One approach to the problem is described in U.S. Pat. No. 4,608,628, entitled "Programmable Controller" issued to Saito et al. on Aug. 26, 1986.

While this approach provides some rudimentary techniques, it is far too restricted to be applied to many "real world" situations. No practical solution to the problems that the real world creates have been developed.

It is clear therefore that there is a need to more efficiently handle and reduce the variables associated with monitoring physical conditions.

SUMMARY OF THE INVENTION

Analysis of real-world applications was vastly improved with the techniques described in U.S. Pat. No. 5,367,449, entitled "Artificial Intelligence System" issued to Manthey on Nov. 22, 1994 (incorporated hereinto by reference).

The Manthey technique establishes the concept of "co-exclusion". In this technique, the computer is connected to its surroundings via a set of binary sensors $S=\{s_1, s_2, \ldots, s_n\}$ understood as a vector space, where each sensor can take on one of two opposing values (e.g. "0"/"1"; or "+1"/"−1"). For the following, $\check{s}$ denotes the opposite of s.

Co-exclusion is attained by:

(1) choosing a subset of S (say $\{s_1, s_2\}$), and with these, (2) observing which values they take on simultaneously, (say $s_1+\check{s}_2$ and at some point in time the opposite relationship $\check{s}_1+s_2$) whereafter, (3) co-exclusion permits the computer on the basis of the two observations in (2) to conclude the existence in its surroundings of an "action", expressed as $s_1s_2$—that is, a vector 'product'—with the property that $s_1s_2=-s_2s_2$.

The important aspect of co-exclusion for present purposes is that the two constituent observations (step (2) above) are complementary. We note that the number of possible subsets of S in step (1) is $2^n$ (i.e. exponential in n).

The Manthey technique though provides no method for choosing the subsets required by step (1) above. The present invention provides an efficient method for accomplishing this task in a concise and controlled manner.

The invention is an improved computer and system therefore which monitors the state of an array of sensors. In this context, the computer is chosen from a variety of suitable apparatus obvious to one of ordinary skill in the art to meet the speed, memory, and versatility required for the particular application.

In the preferred embodiment, sensors monitor a physical condition and have two states. As noted earlier, the sensors generate data indicating their state (i.e. currently being stimulated; or, currently not being stimulated).

While the preferred embodiment uses sensors having two states, the invention also contemplates the use of sensors having more than two states.

A time period is established which is used to identify the sensors which have changed state within this window or time period.

In this context, there are a variety of techniques which can be utilized in the establishment of the time period ($\Delta t$):

1. Make $\Delta t$ large enough to cover the situations of interest;
2. Have several windows (e.g. a variety of $\Delta t$'s with different lengths), thus covering a range of times;
3. Have one or more "clock sensors", which flip much faster than things of interest happen;
4. Have a range of such clocks, each ticking at its own rate, and subscribe these to the window(s).

The preferred technique is to have several windows, each having its time period length, thus covering a range of times. This allows the time period to be quite variable.

The invention thus creates a "time window" or period of size $\Delta t$. Throughout each period, using the computer's memory, all sensor-value changes in the order in which they occur (and in arbitrary order if the changes are truly simultaneous) are stored.

In one embodiment of the invention, the user defines the value of $\Delta t$ from zero (=truly simultaneous) upwards, and the sensor changes that occur within the given $\Delta t$ are viewed as having occurred simultaneously.

The point is that by observing simultaneous changes, if one knows A (i.e. $s_1+\check{s}_2$ currently holds), then B (i.e. $\check{s}_1+s_2$) must have held previously; whereafter, the computer can therefore that the co-exclusion relationship holds as well. The present invention creates a highly improved system for the monitoring of sensors, in that processing proportional to $a^n$, i.e. exponential, is reduced to processing that is polynomial in n.

The capability of the invention provides for a variety of applications and a degree of versatility that is heretofore unattainable:

1) The user may not be interested in co-exclusions of size n, rather, smaller ones may be of interest for the application at hand. An additional user parameter to the invention permits the user to define the "size" of the desired co-exclusions;

2) The time period $\Delta t$ size can be changed dynamically;

3) The reporting to the operator of co-exclusions is variable, permitting all found co-exclusions to be reported or only one at a time. In the latter case, a given co-exclusion may not be 'noticed' the first time it occurs;

4) The user can specify that the invention return only "new" co-exclusions; hence, the system tracks co-exclusions which have been discovered in the past and ignores their re-occurrence;

5) An important aspect of the invention permits the detection of co-exclusions in which one or more sensors are constant for at least the $\Delta t$ wherein the remainder "flip". This is accomplished by associating a second list of sensors with the window, namely those which must be constant over the window's $\Delta t$;

6) The operator is able to define multiple time windows which are simultaneously active;

7) Various subsets of the total set of sensors can be associated with a given window. Such focusing on subsets of the total yields both increased operational efficiency and greater algorithmic flexibility. An example is observing the co-exclusions associated with a "hand" with one window, and the co-exclusions associated with an "eye" with a different window;

8) While traditionally only external sensors are used, the present invention is also able to monitor sensors within the computer itself. Such internal sensors can be created by the computer according to its program.

In some embodiments of the invention, the set of sensors under consideration for a given window is altered dynamically, thereby permitting the invention to adjust its analysis to meet changing conditions.

The invention, together with various embodiments thereof, will explained in more detail by the accompanying drawings and the following description.

DRAWINGS IN BRIEF

FIG. 1 is a functional layout of the preferred embodiment of the invention.

FIG. 2 dramatizes one method of easily identifying sensors which have changed states in the last window.

Figure 3:
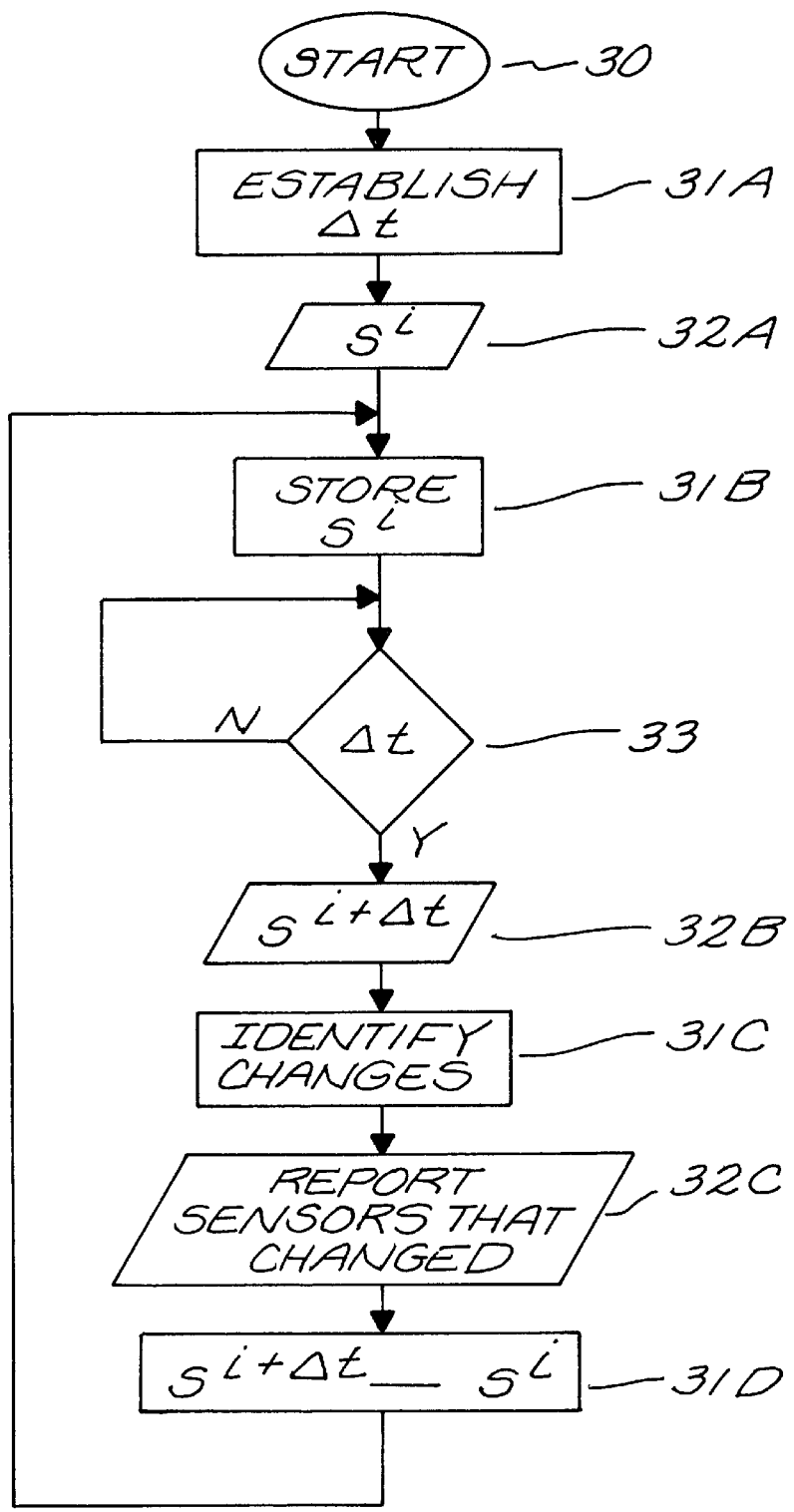

FIG. 3 is a flow-chart of one embodiment of the invention.

DRAWINGS IN DETAIL

FIG. 1 is a functional layout of the preferred embodiment of the invention.

Computer 10, in this illustration, includes monitor 11B, keyboard 11A, and cabinet 11C. Within cabinet 11C are the operational components for the computer including Central Processing Unit (CPU) 12A, Random Access Memory (RAM) 12C, and non-volatile memory 12B. In operation, CPU 12A uses RAM 12C for the temporary storage of data used in operations and employs the use of non-volatile memory 12B for long-term storage of data.

Connected to computer 10 is an array of sensors 13 ($s_1-s_n$) which, in this embodiment, at time "i" are communicated as a string of binary signals identified as $S^i$, 14. Computer 10 uses string $S^i$ 14 in its operation to define sensors potentially exhibiting co-exclusion properties.

A dynamically growing set of internal sensors 15 is also useful and is included in the $S^i$ 14 string.

The chosen time period(s) is/are either established automatically by CPU 12A or is entered by the operator via keyboard 11A. Derived information is either stored in RAM 12C (an alternative embodiment uses disk memory), memory 12B or communicated to the operator via monitor 11B by CPU 12A.

FIG. 2 dramatizes one method of easily identifying sensors which have changed states in the most recent window period $\Delta t$. For ease of illustration, this example shows the use of two time periods while the preferred embodiment performs its operations within a single time period.

One of the tasks which the computer must perform is the identification of which sensors have changed state within the last time window ($\Delta t$). To this end, the exclusive-or of the values is derived from one time period to another is performed. The exclusive-or clearly identifies where a change of state has occurred.

In this illustration, each of the sensors is binary and generates either a "0" or a "1" indicating their state (for simplicity of illustration, eleven sensors are illustrated).

In performing the comparison, a comparison array is established which is $S^i$ xor $S^{i+\Delta t}$.

By way of illustration:

$S^i = \{0\ 1\ 1\ 0\ 1\ 1\ 0\ 0\ 1\ 0\ 0\}$ $S^{i+\Delta t} = \{0\ 1\ 0\ 0\ 1\ 1\ 0\ 1\ 1\ 0\ 1\}$ $XOR = \{0\ 0\ 1\ 0\ 0\ 0\ 0\ 1\ 0\ 0\ 1\}$ This simple mathematical operation clearly shows that sensors $s_3$, $s_8$, and $s_{11}$ have all changed states in the last time window. These three sensors are thus identified for further analysis by either the operator or the computer for co-exclusion properties. From these changes, the co-exclusions $s_3s_8$, $s_3s_{11}$, $s_8s_{11}$, $s_3s_8s_{11}$ could all be derived/deduced/inferred. Note particularly that it was unnecessary to pre-specify which sensors would form a co-exclusion.

FIG. 3 is a flow-chart of an embodiment of the invention.

After start 30, the time window $\Delta t$ is established 31A using any of the techniques discussed above. The current sensor string $S^i$ is received 32A and is stored 31B. Let $\Delta t$ elapse 33. The new current sensor string 32B is compared with the old one from step #1B, changes identified 31C, and reported 32C.

The sensor memory is updated 31D and the program cycles to continue the operation of identifying sensors which change within the same time window.

It is clear that the present invention creates a highly improved system for the monitoring of sensors, in that processing proportional to $a^n$ is reduced to processing that is polynomial in n.

What is claimed is:

1. A computer system comprising:
   a) N physical condition sensors, each of said N physical condition sensors generating electronic data indicative of one of two states of said physical condition sensor;
   b) a computer receiving the electronic data from each of said N physical condition sensors, said computer having,
      1) clock means generating clock data indicative of the passage of time,
      2) means for establishing a time lapse data, and,
      3) monitoring means for identifying sensors, based upon said electronic data, which have changed states during a lapse in time as defined by said time lapse data and said clock data, said monitoring means further generating a data stream identifying physical condition sensors which have changed; and,
      4) means for grouping said physical condition sensors based upon said data stream.

2. The computer system according to claim 1:
   a) further including M physical condition sensors, each of said M physical condition sensors having means for generating electronic data indicative of one of two states of said physical condition sensor; and,
   b) wherein said computer includes means for selectively adding said M physical condition sensors to said N physical condition sensors.

3. The computer system according to claim 1, wherein said computer includes means for automatically adjusting said means for establishing a time lapse data.

4. The computer system according to claim 3, wherein said means for automatically adjusting includes means for identifying a time lapse commensurate with a change in state for at least two of said N physical condition sensors.

5. The computer system according to claim 1, wherein said computer includes means for representing said N physical condition sensors based upon results from said means for grouping.

6. The computer system according to claim 1, wherein said means for establishing a time lapse data is triggered by a change in state of at least two of said N physical condition sensors.

7. The computer system according to claim 1, wherein said monitoring means includes means for identifying sensors which change state within a window commensurate with said time lapse data.

8. The computer system according to claim 1, wherein said computer includes means for communicating to an operator, a representation of physical condition sensors which have changed state within a time window commensurate with said time lapse data.

9. A computer receiving signals from sensors and comprising:
   a) means for automatically establishing a time window;
   b) monitoring means, reacting every time window, for identifying sensors which have changed state during the time window and generating a data stream identifying sensors which have changed; and,
   c) means for grouping said sensors based upon said data stream.

10. The computer system according to claim 9, wherein said means for automatically adjusting includes means for identifying a time lapse commensurate with a change in state for at least two of said N physical condition sensors.

11. The computer according to claim 9, wherein said means for establishing a time window is triggered by a change in state of at least two of said sensors.

12. The computer according to claim 9, further including means for communicating to an operator, a representation of sensors which have changed state within said time window.

13. A computer system comprising:
   a) N sensors, each of said N sensors generating data indicative of a state of a corresponding sensor; and,
   b) a computer receiving the data from each of said N sensors, said computer having,
      1) means for establishing a time window,
      2) monitoring means for identifying sensors which have changed states during said time window, and generating a data stream identifying such sensors, and,
      3) means for grouping said sensors based upon said data stream.

14. The computer system according to claim 13, wherein said computer includes means for automatically adjusting said means for establishing a time lapse data.

15. The computer system according to claim 14, wherein said means for automatically adjusting includes means for identifying a time window commensurate with a change in state for at least two of said N sensors.

16. The computer system according to claim 13, wherein said computer includes means for representing said N sensors based upon results from said means for grouping.

17. The computer system according to claim 13, wherein said computer includes means for communicating to an operator, a representation of sensors which have changed state within said time window.

18. The computer system according to claim 13, wherein at least one of said N sensors generates data indicative of a physical condition of an internal condition of said computer.

\* \* \* \* \*